(12) United States Patent
Fung et al.

(10) Patent No.: US 7,390,664 B2
(45) Date of Patent: Jun. 24, 2008

(54) METHOD AND APPARATUS FOR HIGH THROUGHPUT CATALYSTS SCREENING AND OPTIMIZATION

(75) Inventors: Shun Chong Fung, Bridgewater, NJ (US); Teh Chung Ho, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 367 days.

(21) Appl. No.: 10/324,201

(22) Filed: Dec. 20, 2002

(65) Prior Publication Data

US 2004/0121470 A1    Jun. 24, 2004

(51) Int. Cl.
*G01N 31/10*    (2006.01)
*B01J 19/24*    (2006.01)
*B01J 8/06*    (2006.01)

(52) U.S. Cl. .......................... 436/17; 422/62; 422/129; 422/130; 422/131; 436/85; 436/139; 436/155; 436/159; 436/161; 436/164; 436/172; 436/183

(58) Field of Classification Search .................. 422/62, 422/99, 103, 129, 130–131; 436/37, 85, 436/119, 124, 127, 136, 139, 149, 155, 159, 436/161, 164, 173, 183
See application file for complete search history.

(56) References Cited

U.S. PATENT DOCUMENTS

| 3,206,387 | A | * | 9/1965 | Smilski | 208/27 |
| 3,431,077 | A | * | 3/1969 | Danforth | 422/80 |
| 3,485,771 | A | * | 12/1969 | Horvath | 502/5 |
| 4,099,923 | A | * | 7/1978 | Milberger | 422/80 |
| 5,519,149 | A | * | 5/1996 | Contractor et al. | 549/259 |
| 5,959,297 | A | | 9/1999 | Weinberg et al. | 250/288 |
| 6,030,917 | A | | 2/2000 | Weinberg et al. | 502/104 |

FOREIGN PATENT DOCUMENTS

| EP | 1273919 A1 | 1/2003 |
| WO | WO 98/15969 | 10/1997 |
| WO | WO 00/29844 | 5/2000 |
| WO | WO 00/65326 | 11/2000 |
| WO | WO 01/59463 A1 | 8/2001 |

OTHER PUBLICATIONS

Creer, J. G. et al, Applied Catalysis 1986, 22, 85-95.*
Hogan, R. J. et al, Preprints—American Chemical Society, Division of Petroleum Chemistry 1971, 16, D35-D42.*
Johnston, H. D. et al, Preprints—American Chemical Society, Division of Petroleum Chemistry 1983, 28, 960-972.*
Korf, C. J. et al, CSIR Report CENG 1986, 584, 31 pages.*
Nakazaki, Y. et al, Industrial & Engineering Chemistry Research 1989, 28, 1285-1289.*

(Continued)

*Primary Examiner*—Arlen Soderquist
(74) *Attorney, Agent, or Firm*—Robert A. Migliorini

(57) ABSTRACT

The present invention relates to an apparatus and a process for the high-throughput, quick screening, optimization, regeneration, reduction and activation of catalysts. More specifically, the present invention is a method and apparatus to quickly screen, optimize and regenerate multiple fast deactivating catalysts while maintaining a predefined range of time-on-stream.

17 Claims, 7 Drawing Sheets

First Order Rate Constant Varies With Time On-Stream

OTHER PUBLICATIONS

Smeds, S. et al, Applied Catalysis A: General 1995, 125, 271-291.*
Xiao, X. et al, Applied Catalysis A: General 1999, 183, 209-219.*
Smeds, S. et al, Applied Catalysis A: General 1999, 185, 131-136.*
Sarup, B. et al, Canadian Journal of Chemical Engineering 1984, 62, 249-256.*
Haas, J. et al, Acta Physica et Chemica 1985, 31, 659-669.*
Hutchings, G. J. et al, Applied Catalysis 1988, 43, 133-140.*
Schulz, H. et al, Studies in Surface Science and Catalysis 1991, 61, 313-323.*
Blasco, V. et al, AIChE Journal 1992, 38, 237-243.*
Centi, G. e4t al, Industrial & Engineering Chemistry Research 1992, 31, 1947-1955.*
Resasco, D. E. et al, Journal of Catalysis 1994, 146, 40-55.*
Gayubo, A. G. et al, AIChE Journal 1997, 43, 1551-1558.*
Magagula, Z. et al, Catalysis Today 1999, 49, 155-160.*
Luo, M. et al, Studies in Surface Science and Catalysis 2001, 139, 133-140.*
Toukoniitty, E. et al, Catalysis Today 2000, 60, 175-184.*
Lee, S. H. et al, Applied Catalysis A: General 2002, 237, 91-101.*
Dr. Manfred Baerns, "Parallelisierte Synthese and Schnelle Katalytische Testung von Katalysator-Bibliotheken fur Oxidationsreaktionen", *Chemie Ingenieur Technik* (71), No. 8, Aug. 1999, pp. 873-877.
M. Orschel, "Detection of Reaction Selectivity on Catalyst Libraries by Spatially Resolved Mass Spectrometry", Angew. *Chem. Int. Ed.*, 1999, 38, No. 18, pp. 2791-2794.
P. Cong et al., "High-Throughput Synthesis and Screening of Combinatorial Heterogeneous Catalyst Libraries", Angew. Chem. Int. Ed., 1999, 38, No. 4, pp. 484-488.
S. Senkan et al., "High-Throughput Testing of Heterogeneous Catalyst Libraries Using Array Microreactors and Mass Spectrometry", Agnew. Chem. Int. Ed., 1999, 38, No. 18, pp. 1794-2799.

* cited by examiner

Flow Diagram for A Block of 8 Reactors With Feed In One Reactor

First Order Rate Constant Varies With Time On-Stream

Prime Olefin Selectivity Varies With Time On-Stream

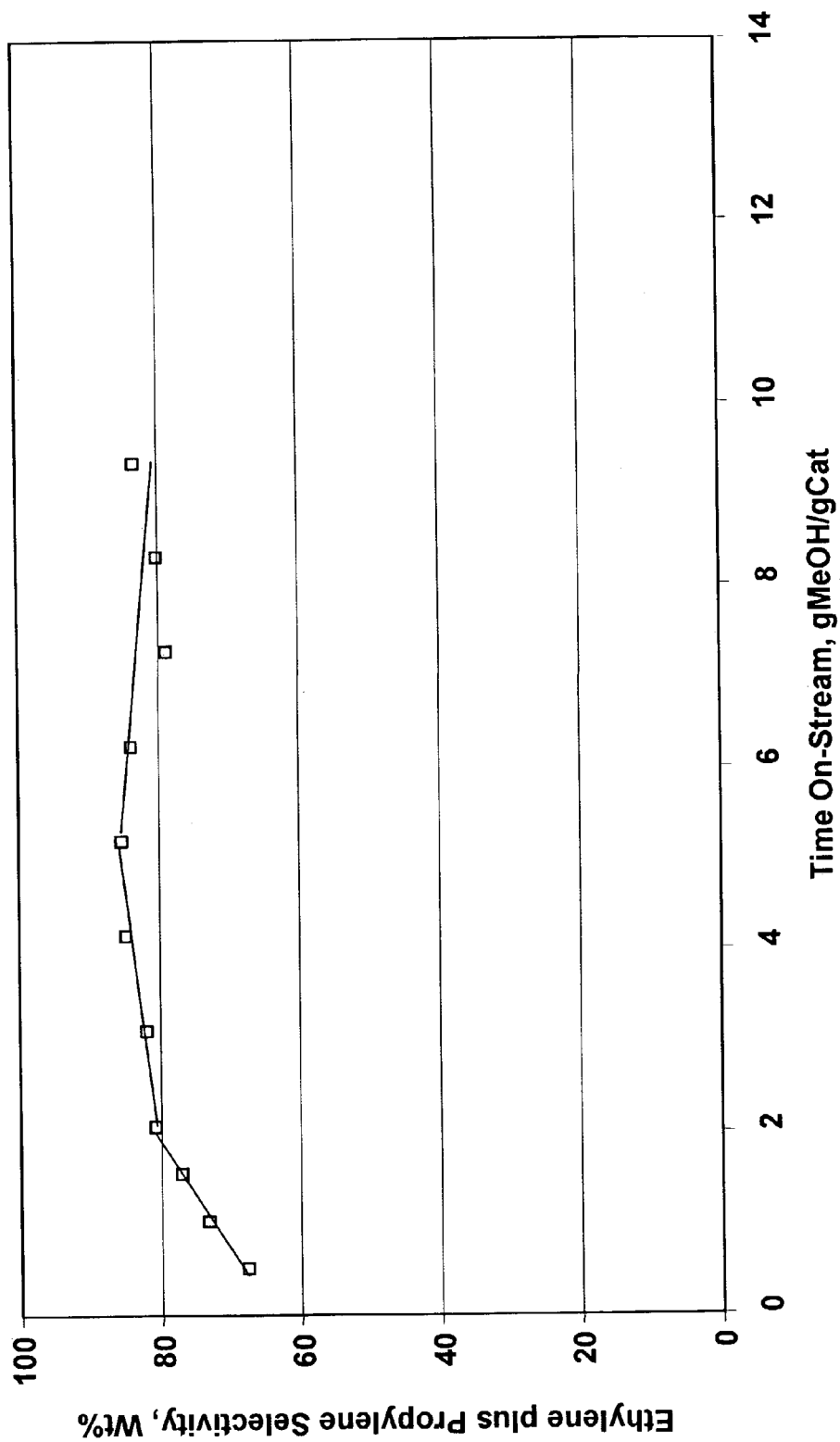

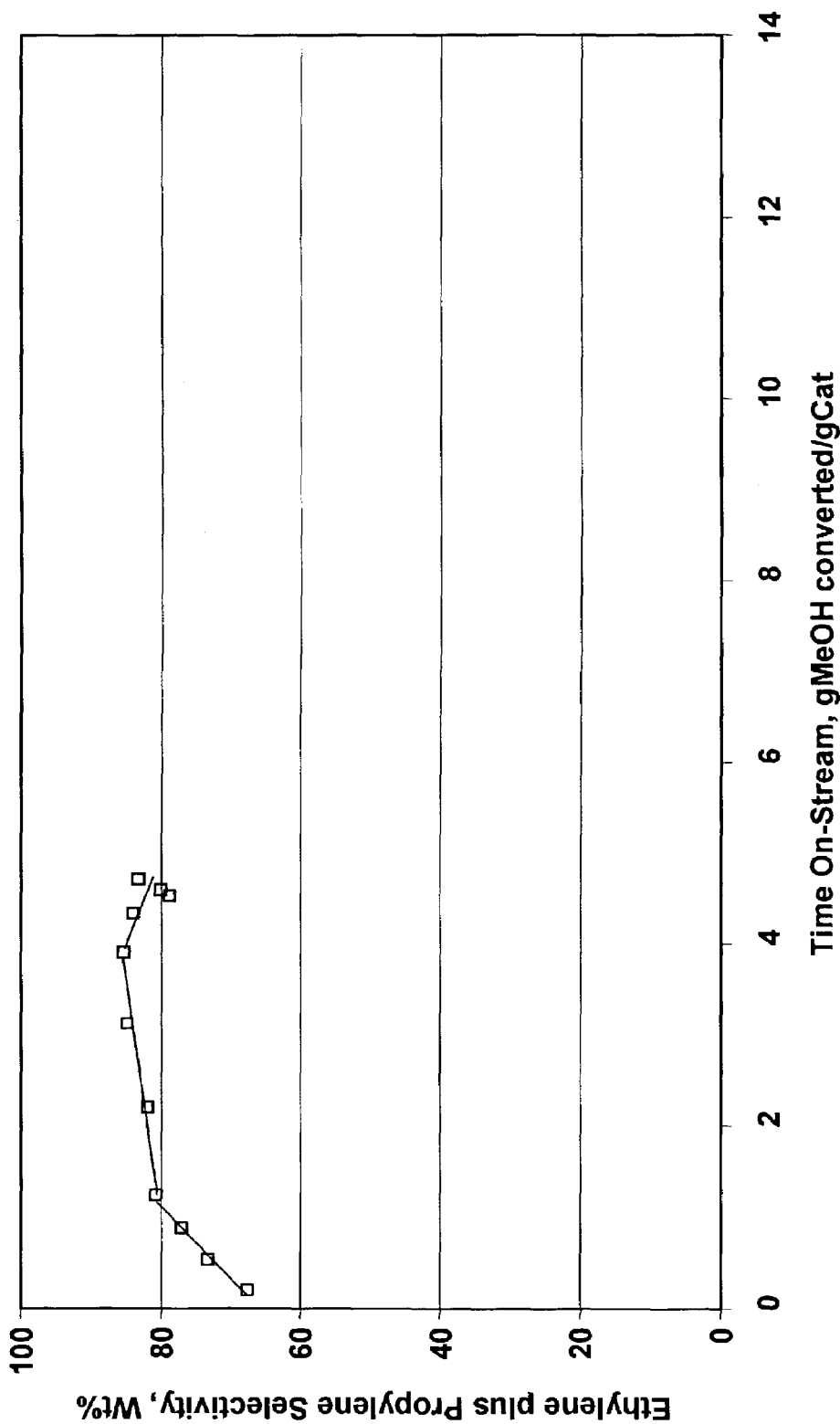

METHOD AND APPARATUS FOR HIGH THROUGHPUT CATALYSTS SCREENING AND OPTIMIZATION

FIELD OF THE INVENTION

The present invention relates to an apparatus and a process for the high-throughput, quick screening, optimization, regeneration, reduction and activation of catalysts. More specifically, the present invention is a method and apparatus to quickly screen, optimize and regenerate multiple fast deactivating catalysts.

BACKGROUND OF THE INVENTION

While many methods have been developed for high throughput screening of catalysts, not one of these previous apparatus or methods have provided the ability to test one catalyst or set of catalysts while simultaneously treating a different catalyst or set of catalysts with a different treat gas. In fast deactivating catalyst, the present invention significantly improves and reduces catalyst screening and optimization times. Although not as critical in stable catalysts with very long deactivation times, the apparatus and method of the present invention still could provide for improvements in catalyst screening and optimization.

In many industrially important reaction systems, the catalysts deactivate on a time scale that is shorter than or comparable to the reaction time scale. The present invention is designed for high-throughput evaluation of fast-deactivating catalysts such as those used in cracking of naphtha and gas oils, methanol to olefins processes, hydrocarbon dehydrogenation over noble metal catalysts, partial oxidation with metal oxides among many others. The deactivation is caused by such nonlimiting mechanisms as coking, fouling, poisoning, reduction or phase transformations among others. The time scales of deactivation range from milliseconds to minutes.

Previous high throughput catalyst systems are inadequate for fast deactivating catalysts because they cannot measure the catalyst performance in the reactor under the same time on stream (TOS), a prerequisite for comparing fast deactivating catalysts. Further, they are also inadequate in that fast-deactivating catalysts require pretreatment, regeneration, reactivation and reduction under proper conditions. This method is applicable to any standard definition of TOS, for example, clock time, weight of reactant processes per weight of catalyst, volume of reactant processed per volume of catalyst, gram of desired products produced per gram of catalyst, among many others. One of ordinary skill in the art would be familiar with other standard forms of TOS.

The patent literature abounds with high-throughput catalyst testing reactor designs. Many of these designs feature parallel reactors able to provide a common feed to the reactors sequentially or in parallel. Many previous inventions, for example U.S. Pat. No. 5,959,297 and WO 00/29844, present catalyst screening methods placing numerous small samples on a very thin substrate. While this method was adequate for stable catalysts, these methods were not suitable for fast deactivating catalysts as the samples were not tested at the same TOS. Also, these substrates do not allow for reaction at one substrate site while regeneration, reduction or some other processes occur at a second substrate site. Moreover, substrate designs would not allow for the careful individualized control of high temperatures and high pressures necessary for many catalytic systems.

Another problem of the above inventions is that they would not be effective for fast deactivating catalysts as their reactant recovery systems were not sensitive enough to recover sufficient product over very short exposure periods. WO 98/15969 solved this problem by proposing feed and recovery tubes that securely attached themselves sequentially to each element of the substrate. However, this invention still could not control the TOS and space velocity precisely enough necessary for fast-deactivating catalysts, nor would they have the ability for a second process to proceed on other substrate members.

U.S. Pat. No. 4,099,923 solved the high pressure and high temperature problems by sending a common feed to numerous parallel reactors. U.S. Pat. No. 6,149,882 developed a parallel reactor system that ensured the same flow rate through a catalyst by placing balancing flow restrictors between the common feed and the reactors and then sending the output to parallel detectors.

However, the '882 invention would not be effective for fast deactivating catalysts. With additional restrictions and balancing efforts, the TOS for each reactor could theoretically be controlled by using the '882 patent invention sequentially, as opposed to the parallel operations suggested. However, the device taught by the '882 invention still would not be useful for fast deactivating catalysts because the catalysts not actually being tested was not maintained in an initialized state (or individually optimized states) by a treatment gas other than the feed gas.

Although many high throughput catalysts screening systems have been developed, none of them would be effective for fast deactivating catalysts as they did not simultaneously control TOS and maintain the other catalysts in a ready condition to be tested. Further, these systems were inflexible even for stable catalysts in that they would not allow treatment of different catalysts in the parallel arrays by different feeds or treat streams.

SUMMARY OF THE INVENTION

The present invention relates to a system to properly screen and optimize fast deactivating catalysts by controlling TOS and keeping the other test candidates in an initialized condition ready for rapid testing. Moreover, the present invention also provides the ability to regenerate and reactivate catalysts in the same apparatus that is also testing other catalysts allowing for far higher throughput of testing and optimization. The present invention also provides an advantage for relatively stable catalysts in that they also may be tested, regenerated and reactivated in the same system without being removed from the testing rig, again significantly improving the efficiency of the catalyst testing and optimization process.

Preferably, the present invention provides a system and a method for the simultaneous testing, initialization, regeneration and reactivation of fast-deactivating catalysts while maintaining a constant TOS (within the range of prespecified TOS's of experimental interest) for all candidate catalysts and providing one or more detection systems that can monitor one, more than one or all of the reactor outputs. In this manner catalyst activity and selectivity may be compared at the same TOS.

BRIEF DESCRIPTION OF THE DRAWINGS

FIG. 6 graphically demonstrates how the selectivity varies with the TOS (as measured in grams reactant per gram of catalyst) for a fast deactivating catalyst.

FIG. 7 graphically demonstrates how the selectivity varies with the TOS (as measured in grams reactant converted per grams of catalyst) for a fast deactivating catalyst.

DETAILED DESCRIPTION

Figure 1:
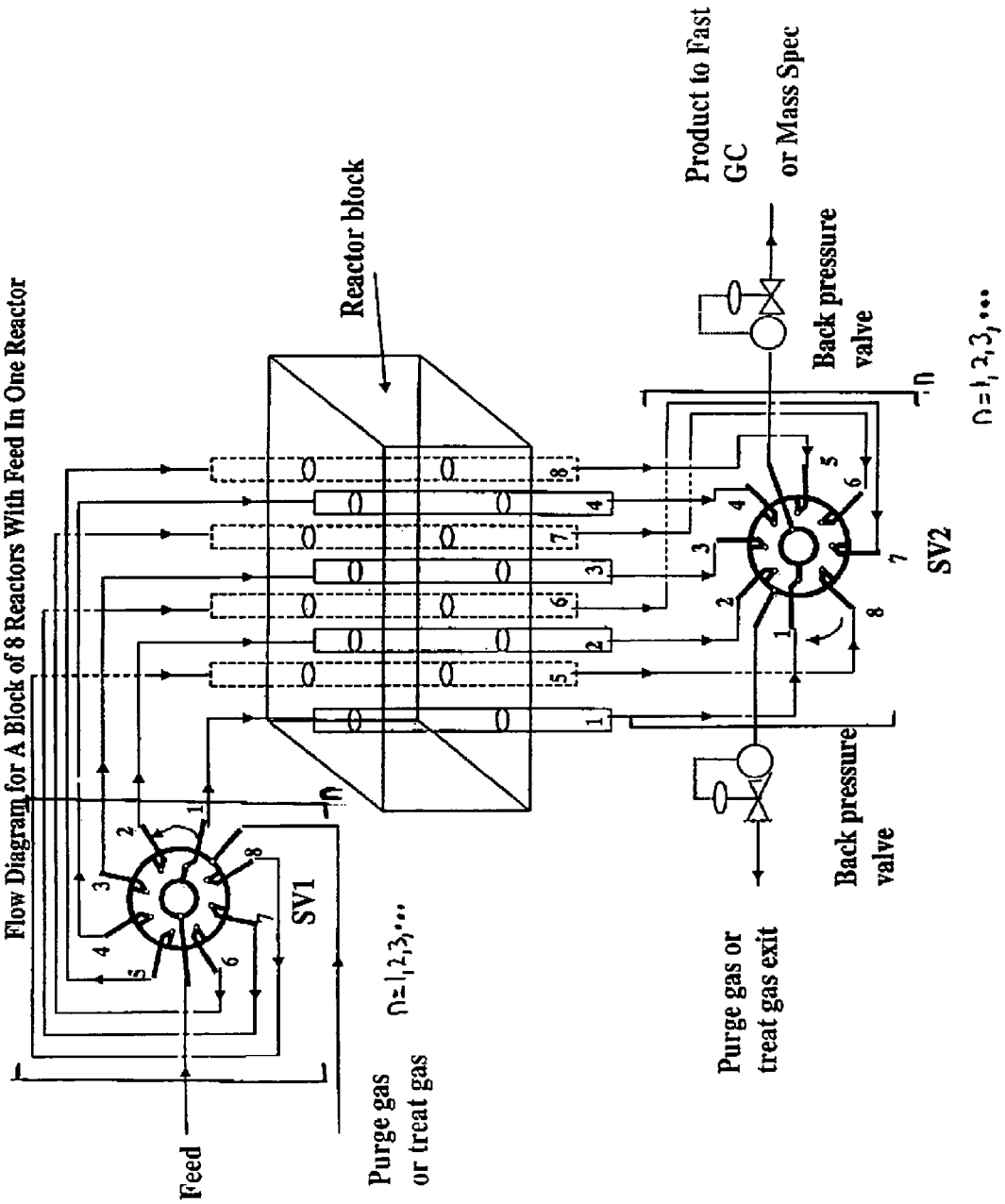
FIG. 1 schematically illustrates a cross-section of this device applied to a two input stream, eight-reactor, one detection stream system.

Fast screening and optimization of catalysts has been long desired in many industries. Although numerous high-throughput catalysts screening inventions have been proposed, none of them provide an efficient method of screening fast-deactivating catalysts. Each of the previous inventions failed to properly control TOS, maintain each of to-be-tested catalysts in a desired pre-tested state, nor did they provide a method for regeneration, reactivation or alternate treatment while in the testing system.

In testing fast deactivating exploratory catalysts, it is essential that all candidate catalysts be tested at the same TOS. Previous reactor array designs would not provide meaningful data for fast deactivating catalysts. For example, for an array of sixty reactors with a ten second for product analysis, the TOS differences between the first reactor and the last reactor in a common feed system may be as long as 10 minutes. For fast-deactivating catalysts with a deactivation time scale in the order of seconds or shorter, this delay would provide meaningless data. The only previous solution was to present each reactor with its own monitoring device, which was far too costly with fast acting GC or mass spectrometers.

The present invention consists of an array of reactors with at least one, and preferably two sets of selection valve systems, the first distributing various input feed streams, the second porting the reactor output streams, and a detection device, such as a fast-scanning mass spectrometer and/or a fast-response GC. At any given time, any of the reactors may be exposed to any individual feed streams. Thus, one reactor (or more) may be exposed to the feed stream containing the reactant of interest (the "on-duty" reactors), while the catalyst beds in the other reactors may be pretreated, regenerated, rejuvenated, stripped, reduced, sulfided or heated under inert environmental conditions (the "off-duty" reactors). One of ordinary skill in the art may easily determine other uses for various other input streams to the catalyst beds.

Generally for catalysts, the various pretreatment process conditions are different than the actual catalyst evaluation or deactivation process. The regeneration of catalysts may be carried out in the present invention. As a non-limiting example, if the catalyst deactivation is due to coke deposition, such as in naphtha cracking and methanol-to-olefin (MTO) reaction, the coked catalysts are treated with an oxygen-containing gas to burn off the coke in an "off-duty" reactor. When catalyst deactivation is due to poisoning by low-concentration contaminants in the hydrocarbon feed, the deactivated catalysts are rejuvenated by desorption with an appropriately chosen gas stream and conditions. The deactivation rate parameters (adsorption capacity and the absorption constant) may be obtained by the TOS data using well know adsorption theories, depending on the extent of the reversibility of the adsorption process.

While monitoring catalytic properties of the "on-duty" reactors, extending the pretreatment process does not harm the activity and selectivity of the catalyst in the off-duty reactor. Thus, the present invention may even be designed for manual switching from pre-treatment to evaluation under the feed of interest, or, preferably, this process may be automated.

The present invention provides an apparatus and method to accurately control TOS for each reactor, thus determining the activity and selectivity in the full range of TOS in a multiple, high-throughput system. The TOS preferably will be controlled from to 0 to 90% deactivation, most preferably from 0 to 50% deactivation. The present invention has the added advantage of being able to test one catalyst while simultaneously performing one or more separate processes on other reactors in the high-throughput system. Preferably, the present system allows for the accurate testing (by controlling the TOS) of one catalyst in one reactor of a high throughput system containing many reactors, while simultaneously allowing pretreatment, regeneration, rejuvenation, stripping, reduction, sulfiding or heating under an inert environment in any one or more of the other reactors in the high-throughput system.

More preferably, the present system allows for the testing of fast deactivating catalysts by accurately controlling TOS in one reactor in a multi-reactor high-throughput system, and sending the reaction product stream from that reactor to one or more fast-response devices while simultaneously either testing the other catalysts with their own (possibly variant) feed stream (and simultaneously sending those output streams to different detectors), or providing pretreatment, regeneration, rejuvenation, stripping, reduction, sulfiding or heating under an inert environment to the other reactors in the high-throughput system.

FIG. 1 is an exemplary flow diagram for a block of 8 reactors with feed reactant flowing through one reactor. Reactant feed gas ("Feed") and purge gas or treat gas ("Purge gas or treat gas") are fed to an inlet stream distribution valve ("SV 1"). The inlet stream distribution valve ("SV 1") ports the reactant feed and purge or treat gas to a series of parallel reactors (numbered 1-8) contained within a heated reactor block ("Block"). In FIG. 1, the reactant feed ("Feed") enters SV1 where it is ported through "1" for entry into on-duty reactor 1. The purge gas or treat gas enters SV1 where it is ported through "2-8" for entry into off-duty reactors 2-8. Hence there is one on-duty reactor (reactor 1) and 7 off-duty reactors (reactors 2-8) depicted in FIG. 1. The reactant feed exiting the on-duty reactor 1 then enters the outlet stream distribution valve ("SV2"). The outlet stream distribution valve ("SV2") ports the streams exiting reactors 1-8 to either a monitoring device ("Fast GC or Mass Spec") for the case of the reactant feed gas exiting the on-duty reactor 1 or to a purge or treat gas exit ("Purge gas or treat gas exit") for the case of the purge or treat gas exiting the off-duty reactors 2-8. The fast GC or mass spec. measures continuously the deactivation of the catalyst from the on-duty reactor 1 while the purge or treat gas simultaneously pretreats, conditions, regenerates, or rejuvenates the catalyst in the remaining off-duty reactors (2-8) in preparation for subsequent catalyst testing with the reactant feed stream ("Feed"). After a designated time on stream (TOS) is achieved for on-duty reactor 1, the inlet and outlet selection distribution systems ("SV 1" and "SV2" respectively) may be controlled to channel the reactant feed gas ("Feed') to a different reactor (one of reactors 2-8 which were previously off-duty) for catalyst deactivation testing, and simultaneously channel the purge or treat gas to reactor 1 (previously on-duty) for catalyst treatment, rejuvenation, regeneration, etc. as now an off-duty reactor. This permits for high-throughput testing of catalysts via the simultaneous flow of reactant gas through the on-duty reactor 1 and the flow of purge or treat gas through the off-duty reactors 2-8.

In one embodiment, the present invention is an apparatus for evaluating catalysts that comprises:

Two or more reaction vessels, each vessel having at least one inlet and outlet;

Each inlet being in direct communication with at least one feed distribution system Each distribution system having at least two incoming streams, the distribution system being able to channel any one or more of the incoming streams to any one or more of the reaction vessels At least one detector that is in communication with any one or more of the output streams.

In another embodiment, the present invention is a method of testing catalysts by:

Placing at least one catalyst in at least two or more reactor vessels, thereby comprising a high-throughput system.

Distributing a first input stream, selected from at least two input streams to at least one reactor vessel, while porting a second input stream to one or more of the other reactor vessels in the high throughput system.

Monitoring the output of at least one reactor vessel.

In another non-limiting embodiment, the present invention is designed for high-throughput evaluation of fast-deactivating catalysts. After being charged to the reactors, the candidate catalysts are tested sequentially in a pre-programmed order so that at any time the feed containing at least one reactant of interest enters only one reactor, the "on-duty" reactor. Each of the reactors may have mass flow controllers to provide exact flow of any of the feed streams to any of the reactors. The GC/mass spectrometer monitors the reaction products of the on-duty reactor until the catalyst activity drops to a preset level, for example half of the original activity. During this process, the catalysts in the off-duty reactor may be rejuvenated, regenerated, sulfided, activated or reduced as necessary to prepare them for their exposure to the feed containing at least one reactant of interest.

In a more specific, non limiting example, a reactor array of 16 reactors in a single unit accommodates two stream selection valves sending two different feed streams to the reactors. The 16 units are mounted into two or more separately heated metal block to provide a constant, but individualized, temperature to all reactors. The catalyst loading in each reactor can vary from several tens of grams to less than 1 mg. In this example, the weight hourly space velocity ranges from 0.1 to 1000 g feed/g cat/hr. The reactor temperatures vary from 150 to 700° C., and reactor pressure varies from atmospheric to 1000 psig. The reactions may be carried out as single or multi-phase.

The fifteen off-duty reactors are provided an inert, non-hydrocarbon containing or hydrocarbon-containing stream through a stream selection valve. To provide similar flow rates to the off-duty reactors using a single mass controller, the variations in conductive restrictions is accounted for by installing individualized restrictors upstream of each off-duty reactor. In actual operations, these off-duty reactors would be kept in a readiness state so that the catalytic properties may be instantly measured.

The first stream selection valve ensures that the feed of interest is only fed to the on-duty reactor. The feed of interest to the on-duty reactor may be provided directly to the reactor through the first stream selection valve, or may first be introduced to a chamber for dilution or mixing with other fluids or poisons before entering the stream selection valve. As mass flow rate must be accurately measured to produce meaningful data, the stream selection valve porting feed to the on-duty reactor has its own mass flow controller. The stream selection valve simultaneously provides a different stream (inert, non-hydrocarbon or hydrocarbon) to the off-duty reactors. A second stream selection valve may be used to direct the output stream from a specific reactor to the monitoring device.

The on-duty reactor is fed for a predetermined TOS, with its output being directed to the monitoring device. At preselected intervals, the two selection valves are simultaneous rotated placing a new reactor on-duty, and taking the previously on-duty reactor off-duty. The output stream of the new on-duty reactor is ported to the monitoring device. The two stream selection valves are not required to be rotated simultaneously. In some embodiments it may be preferred to disconnect on-duty reactor from the monitoring device, allowing an inert gas to purge the monitoring stream, and then later place another reactor on-duty. Similarly, if the valves are rotated simultaneously, the outlet stream from the on-duty reactor may be diverted from monitoring system, replaced by an inert purge. When the purge is completed, the valves may then be simultaneously switched porting the feed of interest to the next reactor interest allowing that reactor's outlet stream to be directed to the monitoring device that was previously purged. The mass flow controller dedicated to the on-duty reactor ensures the same space velocity and TOS.

The present invention provides superiority over the previous known devices in that the each reactor may undergo its own process in a high-throughput manner. Thus, while the on-duty reactor is testing the feed stream of interest, the off-duty reactors may be reactivated and kept in the ready state for fast catalyst testing. Further, this system provides for a matching TOS for each reactor as it becomes the on-duty reactor. Finally, the present invention allows for the rapid incremental monitoring of change in feed composition on various catalysts. Moreover, the candidate catalysts in the off-duty reactors can be pretreated at individually optimized conditions. This is an important feature of the present high-throughput system since different catalysts require different pretreatment conditions. And it is important to evaluate a candidate catalyst at its own optimum pretreatment conditions.

EXAMPLE 1

Figure 2:
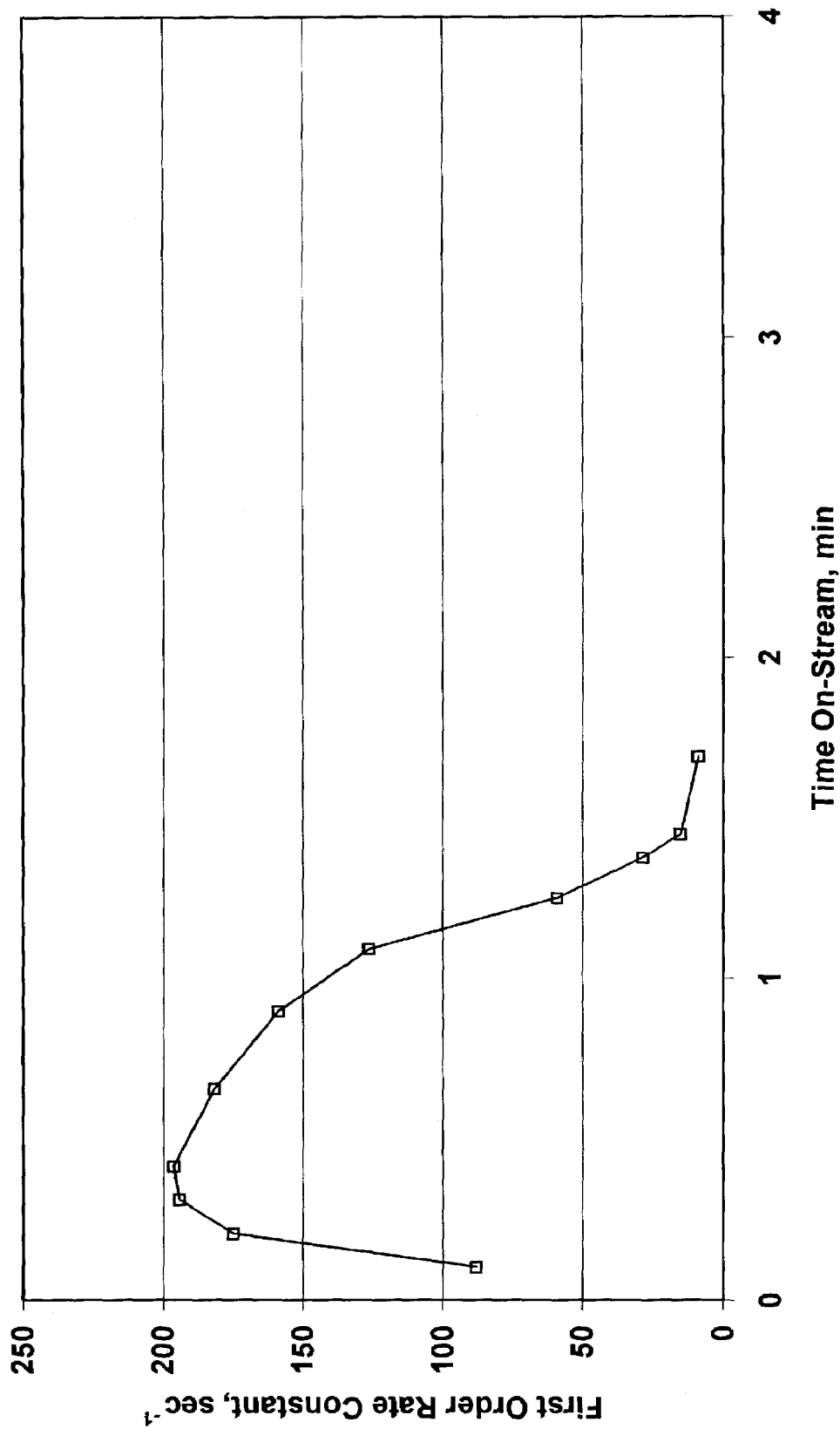
FIG. 2 graphically demonstrates how the first order rate constant varies with the TOS (as measured in minutes) for a fast deactivating catalyst.
Figure 3:
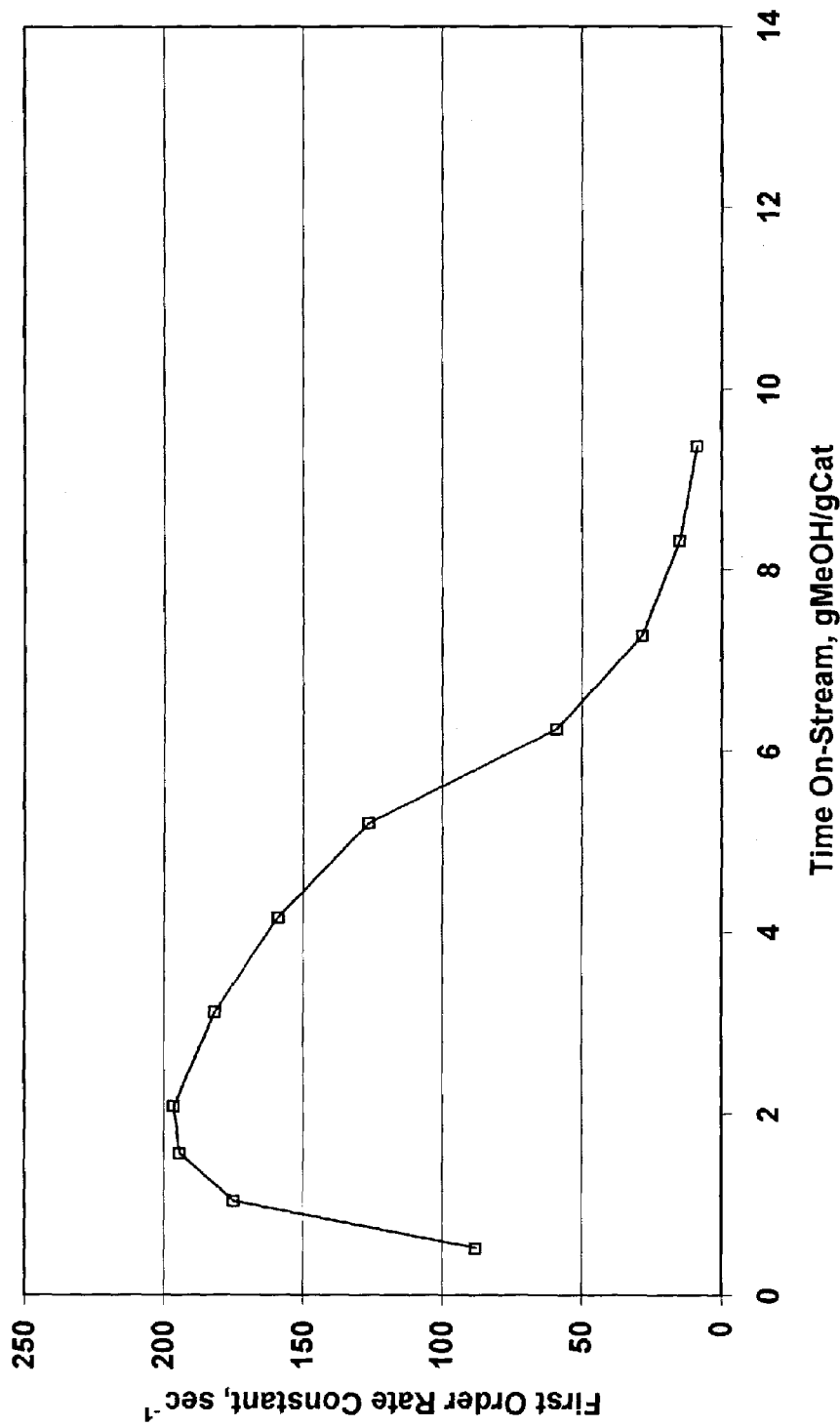
FIG. 3 graphically demonstrates how the first order rate constant varies with the TOS (as measured in grams reactant per gram of catalyst) for a fast deactivating catalyst.
Figure 4:
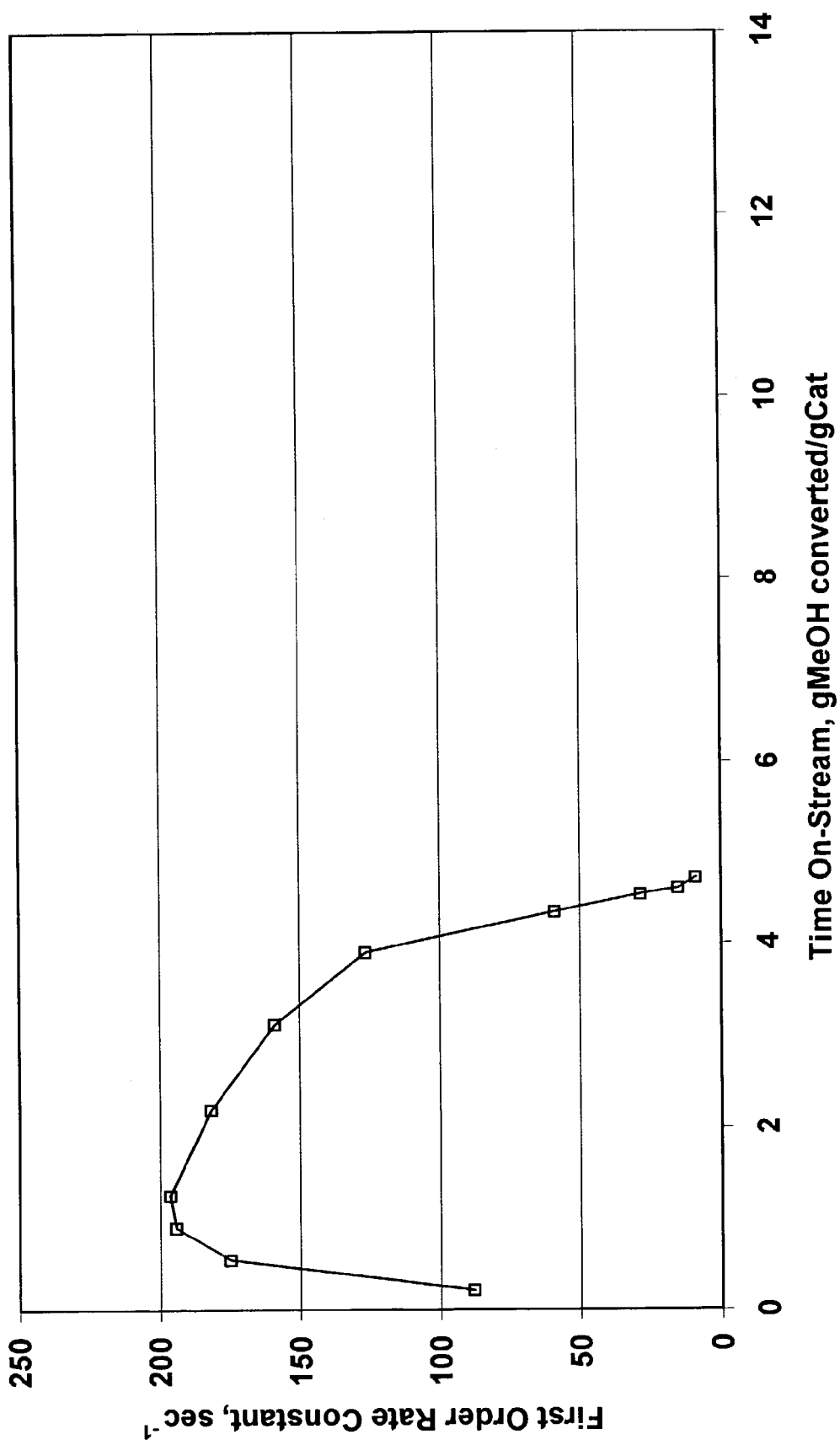
FIG. 4 graphically demonstrates how the first order rate constant varies with the TOS (as measured in grams reactant converted per gram of catalyst) for a fast deactivating catalyst.
Figure 5:
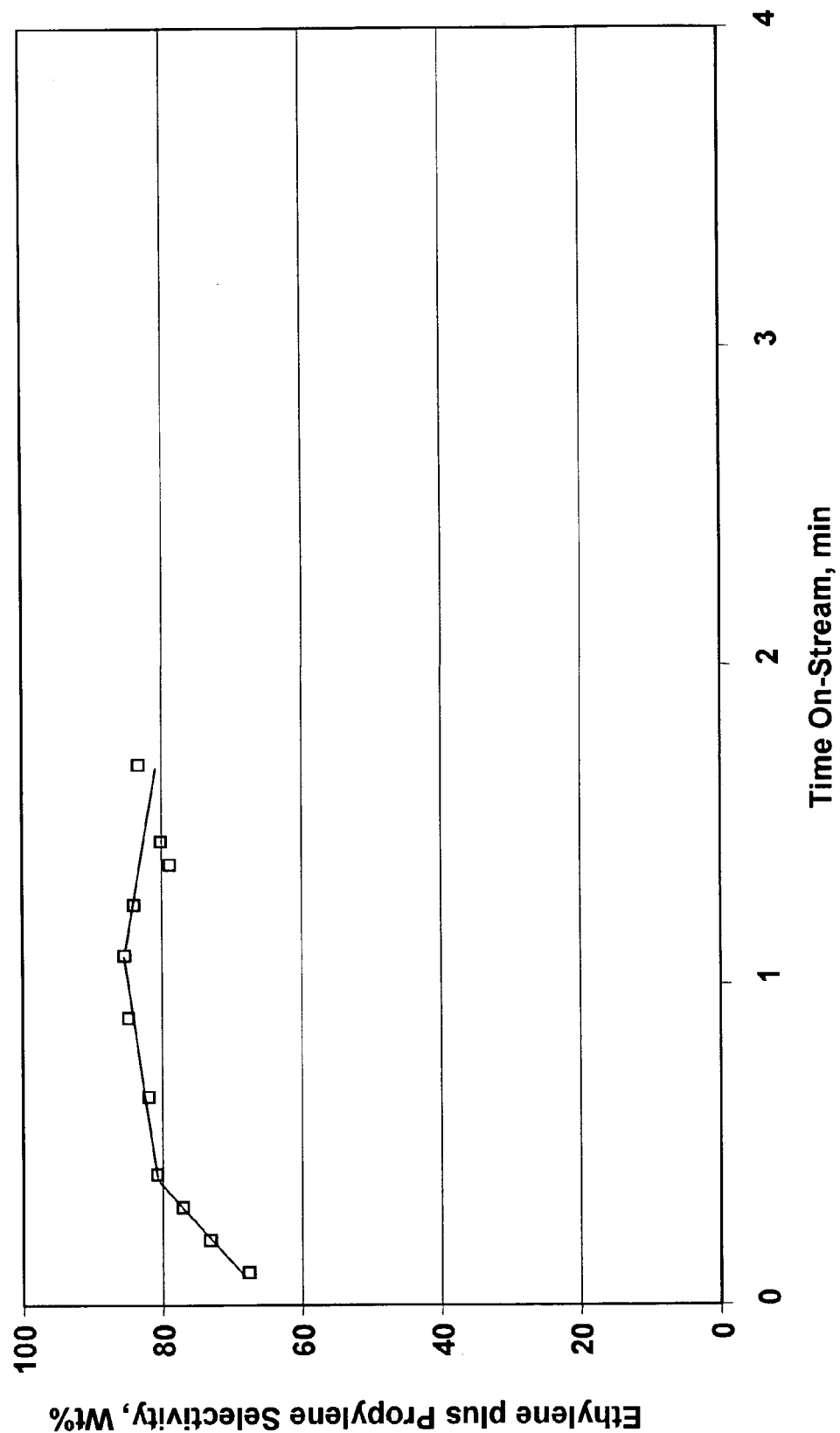
FIG. 5 graphically demonstrates how the selectivity varies with the TOS (as measured in minutes) for a fast deactivating catalyst.

The inventor used the above method to produce a complete performance history of a methanol-to-olefin catalyst containing 40 wt % SAPO-34. Table 1 shows the catalyst performance at 450° C. and methanol partial pressure at 20 to 40 psia as a function of time-on-stream (TOS). The run was carried out with weight hourly space velocities from 258 to 831 g/g/hr (row B in Table 1). Methanol conversion to hydrocarbon and selectivity to combined ethylene ($C_2^=$) and propylene ($C_3^=$) are in rows D and E respectively. There are 11 periods for analysis. Row F shows the amount of methanol passing through one gram of catalyst in each of the analysis period. From these data one can calculate the TOS in term of minutes, gram methanol fed per gram catalyst (g MeOH/g cat) and gram methanol converted per gram catalyst (g MeOH converted/g cat). The first order rate constant, k, is calculated according to the following equation:

$$k = (\text{weight hourly space velocity}) * \ln(1/(1-x/100)) * \\ (\text{density of catalyst/density of gaseous methanol at reaction conditions})$$

where x is the methanol conversion in wt %, ln is the natural log function, density of catalyst=1.5 g/cc and densities of MeOH at reaction conditions are 0.00073 and 0.00147 g/cc for methanol partial pressure of 20 and 40 psia respectively. Methanol density is calculated from the ideal gas law FIG. 2 shows in a short time, within 2 minutes TOS, the catalyst experiences both activation and deactivation. The first order rate constant increases from 88 to 196.4 and then drops to 8.9 sec$^{-1}$. FIG. 3 is similar to FIG. 2 except that the TOS is defined as a dimensionless time in terms of gram of methanol fed per gram of catalyst. FIG. 4 is also similar to FIG. 3 except that the TOS is expressed in terms of gram of methanol converted per gram of catalyst. The interconversion between the three different TOS is shown in Table 1. FIGS. 5, 6 and 7 shows the prime olefin (ethylene plus propylene) selectivity as a function of the three different forms of TOS. The prime olefin selectivity increases with As expected, switching to feed B caused a rapid decline in HDS activity due to site blocking by the nitrogen species. Two key poisoning rate parameters were determined using the Langmuir theory as described by H. Scott Fogler, *Elements of Chemical Reaction Engineering*, 2. Ed., Prentiss Hall, 1992, p. 256. The adsorption capacity of the bulk CoMo catalyst was found to be 0.0044 g N/g cat, compared with 0.0085 g N/g cat for the supported $CoMo/Al_2O_3$—$SiO_2$ catalysts.

What is claimed is:

1. A high-throughput device for evaluating fast deactivating catalysts comprising:
   two or more reaction vessels containing catalyst, each of said reaction vessels having at least one inlet stream and at least one outlet stream wherein one reaction vessel is on-duty and the remaining one or more reaction vessels are off-duty,
   said inlet streams being in direct communication with an inlet distribution system,

TABLE 1

Catalyst performance as a function of time-on-stream

| | | 1 | 2 | 3 | 4 | 5 | 6 | 7 | 8 | 9 | 10 | 11 |
|---|---|---|---|---|---|---|---|---|---|---|---|---|
| A | Period between analyses | 1 | 2 | 3 | 4 | 5 | 6 | 7 | 8 | 9 | 10 | 11 |
| B | Space velocity g/g/hr | 302 | 302 | 302 | 302 | 258 | 258 | 323 | 390 | 492 | 831 | 258 |
| C | MeOH partial pressure, psia | 20 | 20 | 20 | 20 | 40 | 40 | 40 | 40 | 40 | 40 | 40 |
| D | MeOH conversion to hydrocarbons, x, wt % | 40.14 | 63.96 | 67.82 | 68.20 | 91.66 | 88.63 | 74.86 | 41.35 | 18.46 | 6.20 | 11.43 |
| E | $C_2^=$ and $C_3^=$ selectivity, wt % | 67.64 | 73.24 | 77.09 | 80.76 | 81.96 | 84.84 | 85.38 | 83.96 | 78.82 | 80.11 | 83.30 |
| F | g MeOH/g cat at each period | 0.52 | 0.52 | 0.52 | 0.52 | 1.04 | 1.04 | 1.04 | 1.04 | 1.04 | 1.04 | 1.04 |
| G | Time spent at each period, min | 0.10 | 0.10 | 0.10 | 0.10 | 0.24 | 0.24 | 0.19 | 0.16 | 0.13 | 0.08 | 0.24 |
| H | g MeOH converted/g cat at each period | 0.209 | 0.333 | 0.353 | 0.355 | 0.953 | 0.922 | 0.779 | 0.430 | 0.192 | 0.065 | 0.119 |
| I | Time-on-stream, min | 0.10 | 0.21 | 0.31 | 0.41 | 0.66 | 0.90 | 1.09 | 1.25 | 1.38 | 1.45 | 1.69 |
| J | Time-on-stream, g MeOH/g cat | 0.52 | 1.04 | 1.56 | 2.08 | 3.12 | 4.16 | 5.2 | 6.24 | 7.28 | 8.32 | 9.36 |
| K | Time-on-stream, g MeOH converted/g cat | 0.209 | 0.541 | 0.894 | 1.249 | 2.202 | 3.124 | 3.902 | 4.332 | 4.524 | 4.589 | 4.708 |
| L | ln(1/(1 − x/100)) | 0.51 | 1.02 | 1.13 | 1.15 | 2.48 | 2.17 | 1.38 | 0.53 | 0.20 | 0.06 | 0.12 |
| M | First order rate constant, k, 1/sec | 88 | 175 | 194.4 | 196.4 | 181.7 | 159 | 126.4 | 59 | 28.5 | 15.1 | 8.9 |

Weight hourly space velocity is defined as the amount of methanol flowing to one gram of catalyst in one hour, g/g/hr
$C_2^=$ and $C_3^=$ selectivity = (wt % MeOH converted to ethylene and propylene)/(wt % MeOH converted to hydrocarbons) * 100%
Time spent at each period = (row F/row B) * 60, min
Time-on-stream = The time the catalyst seeing the MeOH feed up to the specified period, i.e., adding time in each period (row G) up to the specified period, min
Time-on-stream = How many grams of methanol passing over one gram of catalyst up to the specified period, i.e., adding g MeOH/g cat at each time period (row F) up to the specified period, g MeOH/g cat.
g MeOH converted/g cat at each period = row F * row D/100
Time-on-stream = grams of methanol converted over one gram of catalyst up to the specified period, i.e., adding g MeOH converted/g cat (row H) up to the specified period, g MeOH converted/g cat.

TOS but later decreases. This example shows the importance of obtaining a complete performance history of the catalyst in order to compare catalyst performance when catalyst deactivation is fast.

EXAMPLE 2

The present invention was used to provide kinetic parameters for catalyst poisoning, specifically organonitrogen poisoning of two hydrodesulfurization (HDS) catalysts. The first catalyst was a commercial sulfided $CoMo/Al_2O_3$—$SiO_2$ catalysts. The second is an unsupported CoMo sulfide catalyst. Two feed mixtures were prepared. Feed A contained 0.8 wt % 4,6 diethyldibenzothiophene (46DEDBT) in dodecane. Feed B contained 80 ppm of total nitrogen (N) as 3-ethylcarbazole and 0.8 wt % 46DEDBT. The conditions tested were 265° C. at 250 psig and a hydrogen treat gas rate of 650 SCF/B. For each catalyst, the test started with feed A to line out the catalyst activity in the absence of organonitrogen poison. Then the reactor was switched to feed B.

said outlet streams being directed by an outlet distribution system, said inlet distribution system having two feed streams wherein one feed stream comprises a hydrocarbon reactant for porting to the on-duty reaction vessel and the second feed stream comprises a treat gas for simultaneously porting to the remaining one or more off-duty reaction vessels for pretreatment of catalyst, wherein said treat gas is selected from the group consisting of sulfiding fluids, activation fluids, poisoning fluids and reduction fluids and contains one or more components that react with the catalyst to assist with sulfiding, activation, poisoning or reduction, said inlet distribution system being able to channel said two feed streams to any one or more of said reaction vessels or eliminate feed to any one or more reaction reactor vessels, said outlet distribution system ports the outlet stream from the on-duty reaction vessel to at least one monitor and simultaneously ports the outlet streams from the off-duty reaction vessels through a treat gas purge valve, wherein said inlet and outlet distribution systems include a means to control the on-duty reaction vessel's TOS in going from about 0% catalyst deactivation to about 90% catalyst deactivation based on a signal from said at least one monitor, and wherein said inlet and outlet distribution systems include a control means to modify the treat gas composition to the remaining one or more off-duty reaction vessels for pretreatment of catalyst prior to porting the hydrocarbon reactant to a new on-duty reaction vessel, previously an off-duty reaction vessel.

2. The device of claim 1 wherein the at least one monitor is selected from the group consisting of gas spectrometers, mass spectrometers, IR, gas chromatograph, UV, liquid chromatography, flow meters, elemental analyzers, hydrogen, steam, hydrogen sulfide, oxygen, carbon monoxide, carbon dioxide monitors and combinations thereof.

3. The device of claim 1 wherein said inlet distribution system is a singular valve, wherein said singular valve ports said two feed streams to any one or more said reaction vessels.

4. The device as in claim 1 wherein said outlet distribution system is a singular valve, wherein said singular valve ports any one or more of said outlet streams to any one or more said monitors.

5. The device of claim 1 wherein the on-duty reaction vessel's TOS is controlled to go from about 0% catalyst deactivation to about 50% catalyst deactivation based on a signal from said at least one monitor.

6. The device of claim 1 wherein said hydrocarbon reactant is methanol, naphtha or gas oil.

7. The device as in claim 1 wherein said inlet distribution system and said outlet distribution system are manipulated after TOS is measured for said on-duty reaction vessel to port the hydrocarbon reactant to a new on-duty reaction vessel, previously an off-duty reaction vessel, and to port the treat stream to a new off-duty reaction vessel, previously an on-duty reaction vessel, such as to measure TOS of the new on-duty reaction vessel.

8. The device of claim 1 further including a means for heating and controlling the temperature to each said reaction vessels.

9. The device of claim 8 wherein the temperature of said reaction vessels is from 150 to 700° C.

10. A method of testing fast deactivating catalysts comprising:

loading at least one catalyst of interest into at least two reactors, each reactor vessel having an inlet and an outlet stream directing a feed stream containing at least one hydrocarbon reactant to an inlet distribution system simultaneously directing a treat stream to said inlet distribution system wherein said treat stream is selected from the group consisting of sulfiding fluids, activation fluids, poisoning fluids and reduction fluids and contains one or more components that react with the catalyst to assist with sulfiding, activation, poisoning or reduction, porting said feed stream containing at least one hydrocarbon reactant from said inlet distribution system to one reactor's said inlet stream, wherein said reactor having said feed stream containing at least one hydrocarbon reactant ported to it is known as an on-duty reactor, simultaneously porting said treat stream from said inlet distribution system to at least one other reactor's said inlet stream for pretreatment of catalyst, wherein said other reactor is not the on-duty reactor, and wherein said other reactor is known as an off-duty reactor, porting said on-duty reactor's outlet stream to at least one monitor manipulating said inlet distribution system such that said feed stream containing at least one hydrocarbon reactant is directed to a new on-duty reactor, previously an off-duty reactor, and said treat stream is directed to a new off-duty reactor, previously an on-duty reactor, wherein the TOS of said on-duty reactor is controlled in going from about 0% catalyst deactivation to about 90% catalyst deactivation based on a signal from said at least one monitor.

11. The method as in claim 10 further comprising an outlet distribution system wherein said any one or more of said reactor's said outlet streams are directed to said outlet distribution system which then distributes said outlet streams further to said monitor or through a treat gas purge valve.

12. The method as in claim 10 wherein the TOS of each on-duty reactor is controlled in going from about 0% catalyst deactivation to about 50% catalyst deactivation based on a signal from said at least one monitor.

13. The method of claim 10 wherein said at least one monitor is selected from the group consisting of a gas spectrometer, mass spectrometer, IR, gas chromatograph, UV, liquid chromatography, flow meters, elemental analyzers, hydrogen, steam, oxygen, hydrogen sulfide, carbon monoxide, carbon dioxide monitors and combinations thereof.

14. The method of claim 10 wherein said hydrocarbon reactant is methanol, naphtha or gas oil.

15. The method of claim 10 further comprising modifying the treat gas composition to the remaining off-duty reactors via a control means of said inlet distribution system for pretreatment of catalyst prior to porting said feed stream to a new on-duty reactor, previously an off-duty reactor.

16. The method of claim 10 further comprising heating and controlling the temperature of said at least two reactors.

17. The method of claim 16 wherein the temperature of said at least two reactors is from 150 to 700° C.

* * * * *